United States Patent
Asi et al.

(10) Patent No.: US 11,031,003 B2
(45) Date of Patent: Jun. 8, 2021

(54) DYNAMIC EXTRACTION OF CONTEXTUALLY-COHERENT TEXT BLOCKS

(71) Applicant: MICROSOFT TECHNOLOGY LICENSING, LLC, Redmond, WA (US)

(72) Inventors: Abedelkader Asi, Kfar Bara (IL); Liron Izhaki-Allerhand, Holon (IL); Ran Mizrachi, Mishmar Hashiva (IL); Royi Ronen, Tel Aviv (IL); Ohad Jassin, Tel Mond (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 286 days.

(21) Appl. No.: 15/990,405

(22) Filed: May 25, 2018

(65) Prior Publication Data

US 2019/0362713 A1    Nov. 28, 2019

(51) Int. Cl.
  *G10L 15/22*  (2006.01)
  *G10L 15/06*  (2013.01)
  (Continued)

(52) U.S. Cl.
  CPC .............. *G10L 15/22* (2013.01); *G06F 40/44* (2020.01); *G10L 15/063* (2013.01); *G10L 15/16* (2013.01); *G10L 15/1822* (2013.01)

(58) Field of Classification Search
  None
  See application file for complete search history.

(56) References Cited

U.S. PATENT DOCUMENTS

| 9,570,063 B2 | 2/2017 | Bao et al. |
| 9,678,948 B2 | 6/2017 | Bhatt |
| (Continued) | | |

FOREIGN PATENT DOCUMENTS

| CN | 102682124 A | 9/2012 |
| KR | 20080099883 A | 11/2008 |
| (Continued) | | |

OTHER PUBLICATIONS

Uros Krcadinac, Philippe Pasquier, Jelena Jovanovic, and Vladan Devedzic; Synesketch: An Open Source Library for Sentence-Based Emotion Recognition; Jul. 2013, URL: https://ieeexplore.ieee.org/stamp/stamp.jsp?tp=&arnumber=6589580&tag=1 (Year: 2013).*

(Continued)

*Primary Examiner* — Richa Mishra
(74) *Attorney, Agent, or Firm* — Shook, Hardy & Bacon L.L.P.

(57) ABSTRACT

Technology is disclosed for providing dynamic identification and extraction or tagging of contextually-coherent text blocks from an electronic document. In an embodiment, an electronic document may be parsed into a plurality of content tokens that each corresponds to a portion of the electronic document, such as a sentence or a paragraph. Employing a sliding window approach, a number of token groups are independently analyzed, where each group of tokens has a different number of tokens included therein. Each token group is analyzed to determine confidence scores for various determinable contexts based on content included in the token set. The confidence scores can then be processed for each token group to determine an entropy score for the token group. In this way, one of the analyzed token groups can be selected as a representative text block that corresponds to one of the plurality of determinable contexts. A corresponding portion of the electronic document can be (Continued)

tagged with a corresponding context determined based on the analyzed content included therein, and provided for output.

13 Claims, 7 Drawing Sheets

(51) Int. Cl.
    *G10L 15/16*         (2006.01)
    *G10L 15/18*         (2013.01)
    *G06F 40/44*         (2020.01)

(56) References Cited

U.S. PATENT DOCUMENTS

| | | | |
|---|---|---|---|
| 2008/0249764 | A1 | 10/2008 | Huang et al. |
| 2009/0248399 | A1* | 10/2009 | Au .......................... G06F 40/20 704/9 |
| 2018/0341630 | A1* | 11/2018 | DeVries ................. G06F 16/93 |
| 2019/0130902 | A1* | 5/2019 | Itoh ......................... G06F 40/49 |
| 2019/0362021 | A1* | 11/2019 | Balduino ................ G06F 40/30 |

FOREIGN PATENT DOCUMENTS

| | | |
|---|---|---|
| WO | 0244991 A1 | 6/2002 |
| WO | 2010105396 A1 | 9/2010 |

OTHER PUBLICATIONS

Krcadinac, et al., "Synesketch: An Open Source Library for Sentence-Based Emotion Recognition", In IEEE Transactions on Affective Computing, vol. 4, Issue 3, Jul. 1, 2013, pp. 312-325.
"International Search Report and Written Opinion Issued in PCT Application No. PCT/US19/032077", dated Aug. 13, 2019, 12 Pages.
"Bmcfee/muda", Retrieved from: https://github.com/bmcfee/muda, Aug. 1, 2017, 2 Pages.
"CS224S / LINGUIST285—Spoken Language Processing", Retrieved from: https://web.archive.org/web/20170805171800/http:/web.stanford.edu/class/cs224s/, Aug. 5, 2017, 5 Pages.
"Deep Learning Explained", Retrieved from: https://web.archive.org/web/20180126103738/https:/www.edx.org/course/deep-learning-explained-microsoft-dat236x-0, Jan. 26, 2018, 3 Pages.
"EMU-webApp", Retrieved from: https://web.archive.org/web/20151218115239/http:/ips-lmu.github.io/EMU-webApp/, Dec. 18, 2015, 1 Page.
"English Word Vectors", Retrieved from: https://web.archive.org/web/20180104060006/https:/fasttext.cc/docs/en/english-vectors.html, Jan. 4, 2018, 2 Pages.
"Jettan/Tikz_Cnn", Retrieved from: https://web.archive.org/web/20171120035003/https:/github.com/jettan/tikz_cnn/, Nov. 20, 2017, 2 Pages.
"Lecture Collection | Natural Language Processing with Deep Learning (Winter 2017)", Retrieved from: https://www.youtube.com/playlist?list=PL3FW7Lu3i5Jsnh1rnUwq_TcylNr7EkRe6, Feb. 27, 2018, 3 Pages.
"Model Gallery", Retrieved from: https://web.archive.org/web/20171001214755/https:/www.microsoft.com/en-us/cognitive-toolkit/features/model-gallery/, Oct. 1, 2017, 17 Pages.
"Natural Language Processing with Deep Learning", Retrieved from: https://www.youtube.com/watch?v=OQQ-W_63UgQ&list=PL3FW7Lu3i5Jsnh1rnUwq_TcylNr7EkRe6, Apr. 3, 2017, 5 Pages.
"Welcome to PyInstaller Official Website", Retrieved from: http://www.pyinstaller.org/, 2005, 2 Pages.
Carron, Igor, "Nuit Blanche", Retrieved from: http://nuit-blanche.blogspot.co.uk/2011/12/implementation-of-mallats-scattering.html, Dec. 15, 2011, 44 Pages.
Chuang, et al., "Emotion Recognition from Textual Input Using an Emotional Semantic Network", In Proceedings of Seventh International Conference on Spoken Language Processing, Sep. 16, 2002, 4 Pages.
Deng, et al., "Deep Learning Methods and Applications", In Journal of Foundations and Trends® in Signal Processing, vol. 07, Issue 3, Jun. 30, 2014, 197 Pages.
Dumoulin, et al., "A Guide to Convolution Arithmetic for Deep Learning", In Journal of Computing Research Repository, Jan. 12, 2018, pp. 1-31.
Elharati, Hussien, "Speech Recognition ECE5526", Retrieved from: https://www.youtube.com/playlistist=PLozYAmmJlxb4W3pmWT51KMeuZw08-goiE, Retrieved Date: Feb. 27, 2018, 3 Pages.
Federmann, et al., "Microsoft Speech Language Translation (MSLT) Corpus: The IWSLT 2016 Release for English, French and German", In Proceedings of 13th International Workshop on Spoken Language Translation, Dec. 2016, 6 Pages.
Grave, et al., "fastText/pretrained-vectors.md", Retrieved from: https://github.com/facebookresearch/fastText/blob/master/pretrained-vectors.md, May 3, 2017, 7 Pages.
Graves, et al., "Connectionist Temporal Classification: Labelling Unsegmented Sequence Data with Recurrent Neural Networks", In Proceedings of the 23rd International Conference on Machine Learning, Jun. 25, 2006, 8 Pages.
Guler, et al., "Transfer Data with the AzCopy on Windows", Retrieved from: https://docs.microsoft.com/en-us/azure/storage/common/storage-use-azcopy, Jan. 29, 2018, 42 Pages.
Hershey, et al., "CNN Architectures for Large-Scale Audio Classification", In Journal of Computing Research Repository, Sep. 2016, 5 Pages.
Khorrami, et al., "How Deep Neural Networks Can Improve Emotion Recognition on Video Data", In Proceedings of IEEE International Conference on Image Processing, Sep. 25, 2016, pp. 619-623.
Lopez-Moreno, et al., "On the Use of Deep Feedforward Neural Networks for Automatic Language Identification", In Journal of Computer Speech & Language, vol. 40, Nov. 2016, pp. 46-59.
Lostanlen, Vincent, "Convolutional Operators in the Time-Frequency Domain", In Doctoral Thesis of PSL Research University, Feb. 2, 2017, 199 Pages.
Matejka, et al., "Automatic Language Identification", Retrieved from: https://web.archive.org/web/20150918053007/ http:/speech.fit.vutbr.cz/technologies/automatic-language-identification, Sep. 18, 2015, 2 Pages.
Mohamed, Abdel-Rahman, "Deep Neural Network Acoustic Models for ASR", In Doctoral Dissertation of University of Toronto, 2014, 129 Pages.
Shah, et al., "Mount an Azure File Share and Access the Share in Windows", Retrieved from: https://docs.microsoft.com/en-us/azure/storage/files/storage-how-to-use-files-windows, Sep. 19, 2017, 10 Pages.
Shaheen, et al., "Emotion Recognition from Text Based on Automatically Generated Rules", In Proceedings of IEEE International Conference on Data Mining Workshop, Dec. 14, 2014, pp. 383-392.
Tzirakis, et al., "End-to-End Multimodal Emotion Recognition Using Deep Neural Networks", In Journal of Latex Class Files, vol. 14, Issue 8, Aug. 2015, pp. 1-9.
Wang, et al., "Detecting Emotions in Social Media: A Constrained Optimization Approach", In Proceedings of the Twenty-Fourth International Joint Conference on Artificial Intelligence, Jul. 25, 2015, pp. 996-1002.
Xiong, et al., "The Microsoft 2016 Conversational Speech Recognition System", In Journal of Computing Research Repository, Sep. 2016, 5 Pages.
Yam, Chew-Yean, "Emotion Detection and Recognition from Text Using Deep Learning", Retrieved from: https://www.microsoft.com/developerblog/2015/11/29/emotion-detection-and-recognition-from-text-using-deep-learning/, Nov. 29, 2015, 19 Pages.
Zhang, et al., "Deep Learning for Sentiment Analysis: A Survey", In Journal of Computing Research Repository, Jan. 2018, 34 Pages.

\* cited by examiner

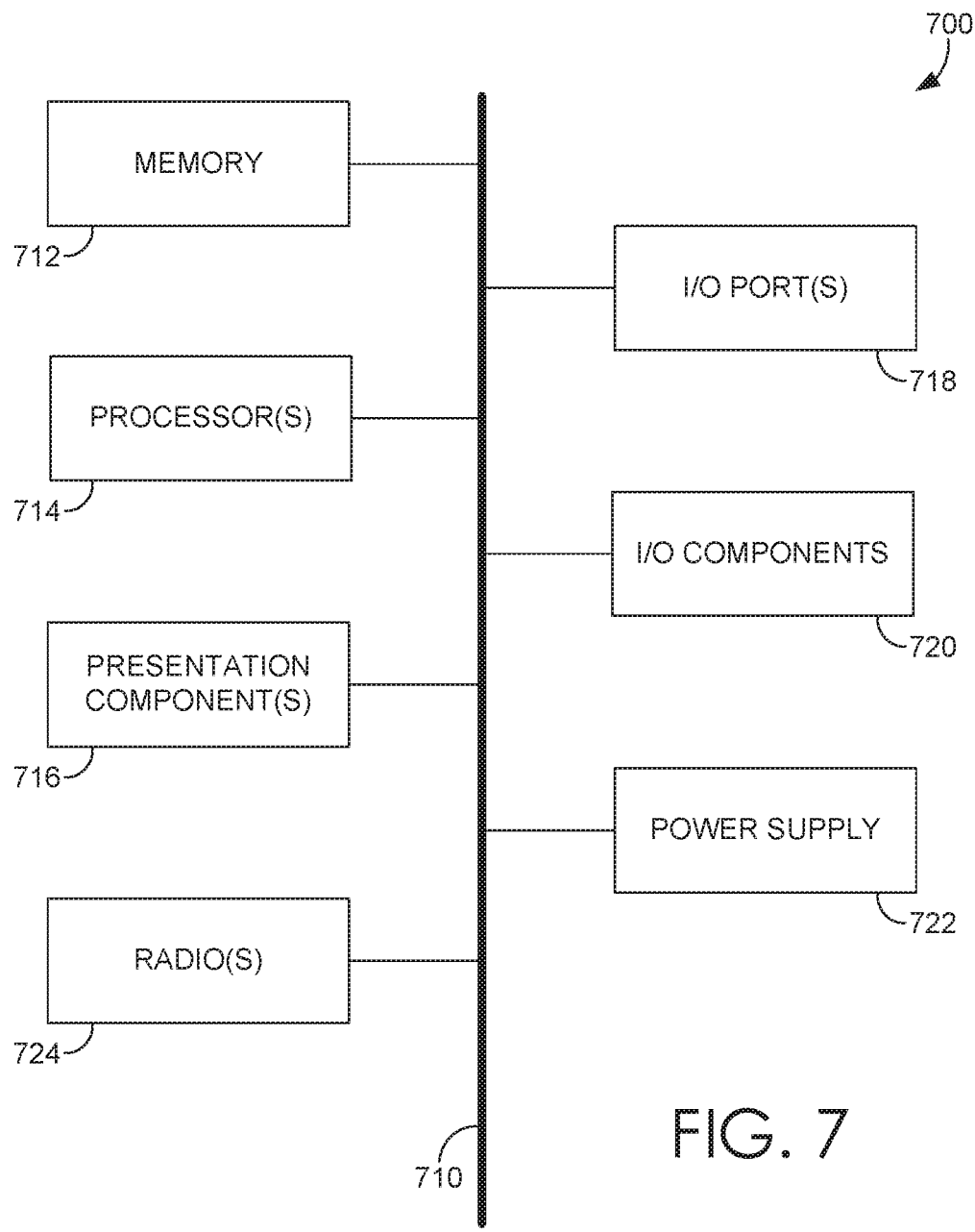

DYNAMIC EXTRACTION OF CONTEXTUALLY-COHERENT TEXT BLOCKS

BACKGROUND

Enormous amounts of electronic data is regularly communicated throughout the world, facilitated by computers, the Internet, social media, and the like. An increasing amount of technology is being developed for purposes of data analytics, particularly for understanding contextual undertones in user speech or works of authorship, such as user preference, behavior, intent, sentiment, or emotion, among other things. Such information can be highly relevant and valuable to various industries, particularly for service-based industries that strive to improve customer relations. While a variety of context-determining technology exists, the technology is still rudimentary in the sense that linguistic nuances, such as transitions of mood, sarcasm, emotion, and the like, are typically undetectable, and even if detectable, are generally inaccurate because conventional analytics are generally performed on a fixed-input size basis. Similarly, as seen in electronic documents transcribed or generated by voice-to-speech technologies, the resulting translations can result in misspellings, errors in punctuation, and a variety of other "lost in translation" mishaps that conventional sentiment-identifying technologies are likely to misinterpret.

SUMMARY

Embodiments of the present invention generally relate to contextual analytics of electronic content. More specifically, embodiments describe improved techniques for automating contextual analysis of content in electronic documents, and accurately determining where contextual undertones or meaning (e.g., emotion, sentiment, preference, behavior, intent) of an author changes within the document with high accuracy. As conventional analytics systems tend to focus on a fixed-size input for determining context from electronic documents, a more ideal and accurate approach, described herein, includes a dynamic analysis and extraction of variably-sized portions of an electronic document based on calculated entropies and entropy scores, among other things, so that sudden changes in the contextual undertones or meaning are not misinterpreted. In accordance with various embodiments described herein, a "context" determined from content or electronic data can include an emotion, sentiment, preference, behavior, meaning, or intent, among other things.

In various embodiments, portions of an electronic document can be pared down into tokens based on a variety of identifiable characteristics. Starting at a first token (e.g., an anchor token), a series of token sets or in other words the content included in each token set in the series, can be independently analyzed. Each token included in the series of token sets includes the first token. In this regard, a first token set in the series includes only the first token. A second token set in the series includes only the first token and an immediately subsequent second token. A third token set in the series includes only the first, second, and immediately subsequent third token, and so on until a predefined number (e.g., a defined maximum) of token sets is parsed from the electronic document. Each token set in the series, up to the predefined number, is analyzed to determine a corresponding set of contextual confidence scores. Each contextual confidence score in a determined set of contextual confidence scores corresponds to a determined likelihood that content included in the token set corresponds to one of a variety of human emotions, underlying sentiments, author preferences, author behaviors, underlying meanings, or author intentions, among other things. After each token set in the series is analyzed so that a corresponding set of contextual confidence scores is determined therefor, a contextual entropy score is calculated for each set of contextual confidence scores. In this regard, each token set in the series has a corresponding contextual entropy score calculated based on its corresponding set of determined contextual confidence scores. The token set determined to have a lowest contextual entropy score in the series is selected as a representative token set, and one of the variety of human emotions, underlying sentiments, author preferences, author behaviors, underlying meanings, or author intentions, among other things associated with a highest contextual confidence score in the selected representative token set is identified as the representative emotion, sentiment, preference, behavior, meaning, or intent, among other things. The representative token set can then be tagged, so that the electronic document includes a visual indication that the content included in the representative token set is associated with the representative context.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 7 is a block diagram of an exemplary computing environment suitable for use in implementing some embodiments of the present invention.

DETAILED DESCRIPTION

Figure 1:
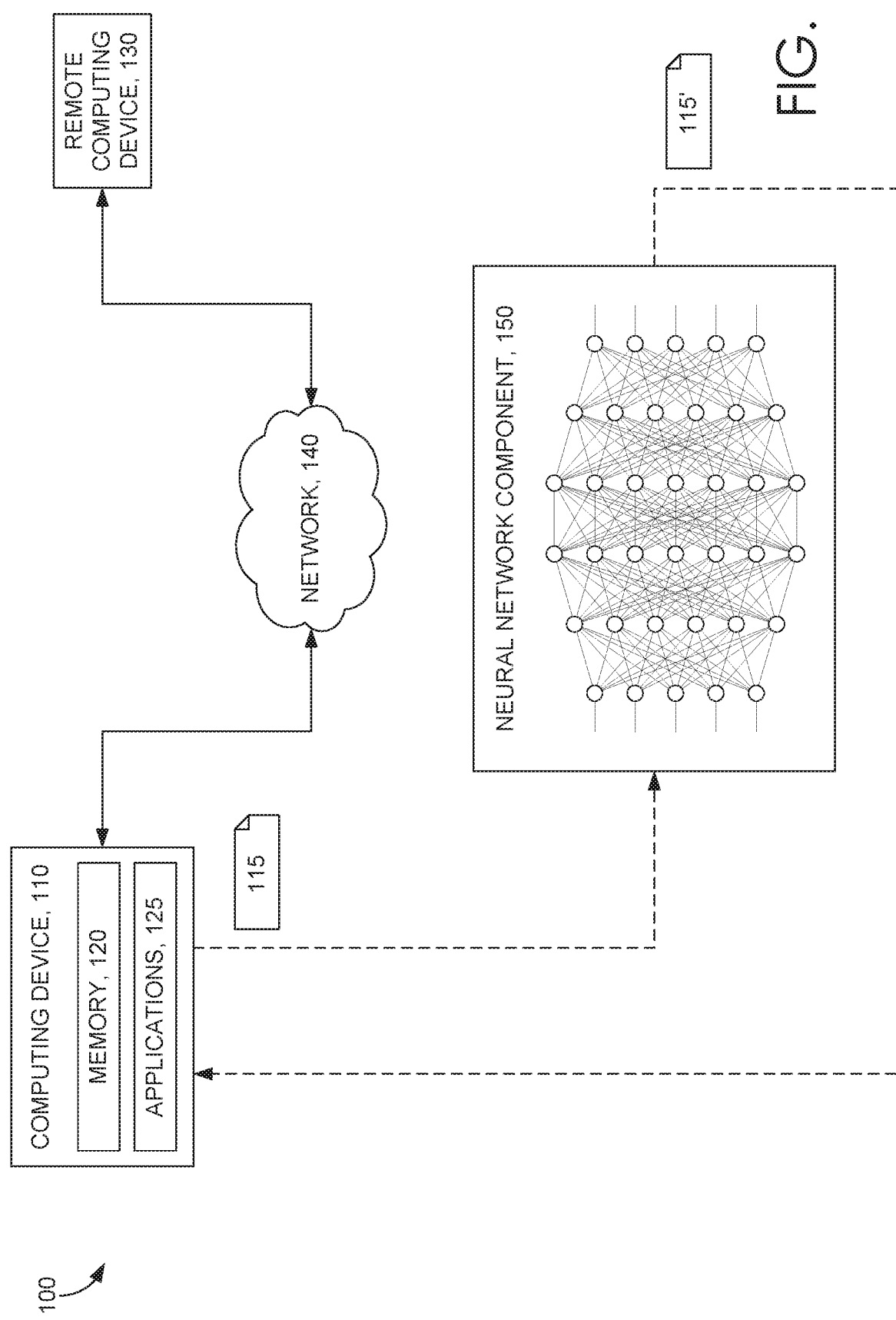
FIG. 1 is a schematic of an exemplary system depicted in accordance with some embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the terms "a" or "an" that precede an element of, or data associated with, the described systems or elements can also be substituted with "at least one" or "one or more," while remaining within the purview of the present disclosure. In the same regard, the term "set" is used herein to correspond to a number of elements greater than or equal to one.

As digital media and electronic transfer of data continues to dominate how information is communicated throughout the word, various techniques for extrapolating author or speaker sentiment from electronic content has been developed. Such techniques have been heavily implemented into commercial applications, mostly for analytics purposes, to generate useful information about social reactions to products, services, events, and the like. These analytics tools can be incorporated into applications that analyze social media feeds, blogs, electronic documents, emails, audio or video transcripts, or any other electronic means of communication.

While the amount of information continues to grow, so do the demands for efficiency and accuracy of processing such information. Moreover, conventional analytics systems have typically been implemented around the detection of user sentiment. That is, conventional systems have been designed to generally determine whether an author's opinion about products, services, events, etc. are generally positive or negative in nature. Naturally, as one may assume, the mere detection of sentiment in language is only a rudimentary layer of textual analysis. One of skill in the art is aware that while humans, starting from an early age, can easily detect sentiment, it takes a more mature and skilled individual to understand emotion from text-based content alone. Languages generally have nuanced characteristics that are either deep rooted in culture or changed over time due to societal influence. Emotions, such as surprise, joy, fear, sadness, sarcasm, and more, are oftentimes difficult to detect when taken out of context. This is why conventional analytics systems have a difficult time in accurately determining emotion from electronic content, because oftentimes such systems focus on a sentence-by-sentence analysis, or some other input of a fixed size. An ideal and improved technique would analyze more than sentences, but variable blocks of sentences, to determine whether the author's emotion is consistent as sentences flow from one to the next.

Embodiments of the present disclosure are generally directed to techniques that analyze variable portions of an electronic document employing a "shifting window" of analysis to identify blocks of text that are determined to most likely correspond to a human emotion. The described embodiments provide improved results in the field of textual analytics by recognizing a deeper level of sentiment in text-based content, that being emotion, and further recognizing shifts in emotions so that portions of an electronic document can be easily identified based on a determined related emotion. Further, some embodiments provide specific advantages over conventional analytics techniques used for analyzing automatic transcriptions, such computer-performed automatic speech recognition to generate transcriptions from audio or video sources. In particular, such automatic transcriptions often suffer from over punctuation or inaccurate punctuation, such as putting periods to mark the end of sentences in the middle of sentences where there is a pause in the audio. Consequently, many conventional emotion-analysis technologies that analyze emotions on a sentence-by-sentence basis will produce inaccurate results due to the over-punctuation (or inaccurate punctuation) problem. In contrast, the techniques employed by some embodiments of described herein that utilize a shifting window and analysis of variable portions of the document are able to overcome this problem. Still further, it is not uncommon for automatic transcriptions to contain misrecognized words, due to noise, interference, or poor audio quality. Conventional techniques that analyze emotion on a sentence-by-sentence basis or portion-by-portion (e.g., phrase-by-phrase or paragraph-by-paragraph) basis will produce inaccurate results; whereas the techniques utilized by some embodiments herein are able to mitigate the consequence of the misrecognized words due to deriving an emotional analysis from an aggregate window of overlapping portions of text, as described herein.

Some embodiments of the present disclosure can be performed by a neural network that has been trained to perform various operations described herein. It is further contemplated that the neural network can be partially trained, and further trained based on information generated in accordance with the operations described herein.

In more detail, as noted, portions of an electronic document can be pared down into tokens based on a variety of identifiable characteristics that facilitate the beginning and/or end of a token. The term electronic document is used broadly herein and may comprise nearly any text document, collection(s) of textual information, or corpus of text, such as social media feeds, blogs, electronic communications (e.g., email, instant message, SMS text messages), word processing documents, presentation slides, spreadsheets, webpages, audio or video transcriptions (which may include closed captioning text, automatic transcriptions generated by a computing process, text extracted from a visual source (which may be extracted using object character recognition (OCR), for example) or transcripts made in near real-time), a combination of these, or nearly any other electronically formatted or stored collection of textual information or information that can be converted or represented via textual information, including a plurality of related electronic documents or textual information source(s). A token can be, for instance, a sentence that begins with a capital letter and/or ends with a period, or a paragraph that begins with an increased margin and precedes another paragraph having an increased margin, or a field in a XML or HTML file that opens with a "<" and ends with a ">" by way of example only. A token can also be a single word or phrase, and may include text extracted from a visual source (e.g., OCR'd text). A series of tokens, as described herein, can include a combination of plain text, OCR-derived text, or any type or combination of text from an electronic document source, such as described above. Other identifiable characteristics not described herein can be employed without limitation.

Starting with a first token (e.g., an anchor token), a series of token sets can be generated and independently analyzed. Each token included in the series of token sets includes the first token. In this regard, a first token set in the series will only include the first token. A second token set in the series will only include the first token and an immediately subsequent second token, that is, a token that immediately follows the first token in the electronic document. A third token set in the series only includes the first, second, and immediately subsequent third token, and so on until a predefined number (e.g., a defined maximum) of token sets is parsed from the electronic document. In other words, given an anchor token, a predefined number of token groups (e.g., a first group with the anchor token, a second group with the anchor token and a subsequent token, a third group with the two subsequent tokens, and so on) can be generated so that each token group is independently analyzed. In a preferred embodiment, three tokens in a token set may be employed as an optimal predefined number, though any number of tokens may be employed with some variable results. Examples provided herein will be explained in the context of employing a predefined number of three tokens as a maximum in a token set, though these examples are not intended to be limiting and are described merely for purposes of explanation.

Each token set in the series, up to the predefined number, can be generated and analyzed to determine a corresponding set of emotional confidence scores. Each emotional confidence score in the determined corresponding set of emotional confidence scores corresponds to a determined likelihood that content included in the token set corresponds to one of a variety of human emotions. So, in other words, for a first series of token sets, a first token set includes the first token, a second token set includes the first token and a second token, a third token set includes the first token, the second token, and a third token. In this example, as the third token set includes the predefined number of tokens, the identification of the corresponding token series for purposes of analysis is complete. To clarify, each token set in the first series of token sets includes the first token, also referenced herein as the "anchor token." The anchor token is identified as the token at which the definition of a new token series begins, and a first token set in a new token series will always include the anchor token alone. Each subsequent token set parsed from the electronic document for inclusion in the new token series will always include one more token than a previously generated token set. So, in other words, a second token set in the new token series will always include the anchor token and an immediately subsequent token parsed from the electronic document.

Each token set in a generated series of token sets can then be analyzed to determine a corresponding set of emotional confidence scores. In other words, the content included in each token set of the generated series is analyzed to determine an emotional confidence score for each emotion from a defined plurality of determinable emotions. In this regard, a token within a token set includes a plurality of determined confidence scores, whereby each confidence score determined for the token corresponds to a likelihood that the content of the token corresponds to a particular context. Various tools for analyzing the content to determine an emotion may be employed, such as a neural network or a third party content sentiment/emotion analyzer. In this way, each token set in the generated series of token sets has a corresponding set of emotional confidence scores. Each confidence score in the corresponding set of emotional confidence scores corresponds to one of a defined plurality of determinable human emotions, such as, by way of example only, joy, fear, anger, surprise, sadness, sarcasm, neutral, and the like.

As various embodiments described herein are generally directed to implementations relating to emotions determined from dynamically and variably-sized portions of electronic content, it is contemplated that an author's sentiments, preferences, behaviors, meanings, or intentions, among other like terms, can be similarly determined while remaining within the purview of the present disclosure. When dealing with contexts outside of or including the emotion realm, other types of contextual definitions or parameters can be employed for determination within the purview of the present disclosure. For instance, in accordance with some embodiments, a confidence score can also or alternatively correspond to one of a plurality of meanings for a single term (e.g., a medical definition or meaning, a technical definition or meaning, a conversational definition or meaning, a satirical definition or meaning). In a non-limiting example, the term "gnarly" can be interpreted has having either a negative or a positive connotation, depending on the context of the immediately surrounding content. In this regard, embodiments of the present disclosure can be employed to determine confidence scores of positive or negative sentiments, variable definitions, or other interpretations of content that otherwise would not be interpretable with conventional systems.

After each token set in the series is analyzed so that a corresponding set of emotional confidence scores is determined therefor, an emotional entropy score is calculated for each determined set of emotional confidence scores. In this regard, each token set of a series can have a corresponding emotional entropy score that is calculated based on its corresponding set of determined emotional confidence scores. The token set determined to have a lowest emotional entropy score in the series is selected as a representative token set, and one of the variety of human emotions associated with a highest emotional confidence score in the selected representative token set is identified as the representative emotion of the representative token set. The representative token set can then be tagged, so that the electronic document includes a visual indication that the content included in the representative token set is associated with the representative emotion.

Accordingly, in one aspect, an embodiment of the present invention is directed to a computer storage media storing computer-useable instructions that, when used by a computing device, cause the computing device to perform operations for extracting and tagging or indexing emotionally-coherent text blocks in electronic documents. The operations include determining, for each token set in a predefined number of token sets parsed from an electronic document, a corresponding set of emotional confidence scores based on content included in the token set. A first token set in the predefined number of parsed token sets includes a first token parsed from the electronic document, while each additional token set in the predefined number of parsed token sets includes the first parsed token and a corresponding number of subsequently parsed tokens (e.g., n+1). More specifically, by way of example, the first token set includes a first parsed token, and the second token set includes the first parsed token and a second parsed token positioned, within the electronic document, immediately subsequent the first parsed token. The operations further include calculating, for each token set in the predefined number of parsed token sets, a corresponding emotional entropy score based on the corresponding set of determined emotional confidence scores. The operations also include tagging a particular token set in the predefined number of parsed token sets as an emotionally representative token set based on a determination that the particular token set has a lowest calculated corresponding entropy score relative to other parsed token sets in the predefined number of parsed token sets.

In another embodiment of the invention, an aspect is directed to a computer-implemented method for extracting and tagging or indexing emotionally-coherent text blocks from electronic documents. The method includes determining, by a computing device, a corresponding set of emotional confidence scores for each token set in a predefined number of token sets parsed from an electronic document. Each emotional confidence score in the corresponding set of emotional confidence scores can correspond to a likelihood that content included in the token set is associated with one of a plurality of determinable human emotions. Each token set in the predefined number of parsed token sets includes a first token of the electronic document. The method further includes calculating, by the computing device, a corresponding emotional entropy score for each token set in the predefined number of parsed token sets based on the corresponding set of determined emotional confidence scores. The method also includes tagging, by the computing device, a particular token set in the predefined number of parsed token sets as a representative token set based on a determination that the particular token set has a determined lowest calculated emotional entropy score. The method further includes providing for display, by the computing device, the electronic document with a visual representation indicating that the content included in the tagged particular token set is associated with one of the plurality of determinable human emotions determined to correspond to a highest generated emotional confidence score in the tagged particular token set.

A further embodiment is directed to a computerized system for extracting and tagging or indexing emotionally-coherent text blocks from electronic documents. The system comprises, among other things, a token parsing component for identifying tokens from an electronic document, a token set parsing component for generating a predefined number of token sets that each includes an anchor token, an emotional confidence scoring component for determining a set of emotional confidence scores associated with each token set in the generated predefined number of token sets based on content included in the token set, each emotional confidence score in the determined set of emotional confidence scores corresponding to one of a plurality of determinable human emotions, an emotional entropy scoring component for calculating an emotional entropy score associated with each token set in the generated predefined number of token sets based on the set of determined emotional confidence scores associated with the token set, and an emotional block identifying component for selecting one of the generated predefined number of token sets having a highest calculated emotional entropy score and identifying, from the selected token set, one of the plurality of determinable human emotions corresponding to a highest emotional confidence score in the determined set of emotional confidence scores associated with the selected token set.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, various functions may be carried out by a processor executing instructions stored in memory.

The system 100 in FIG. 1 includes a computing device 110 that is operable to access an electronic document 115 stored in a memory. The electronic document 115 can be obtained by the computing device 110 stored in a local memory 120, or retrieved from a memory (not shown) of a remote computing device 130 accessed via a network 140, such as the Internet, and subsequently stored in the local memory 120. The electronic document 115 includes digital content, which may include, among other things, text, images, video, audio, or other digital media, by way of example. The computing device 110 can also include applications 125 installed thereon or accessible thereby, which are operable to access and provide for display the electronic document 115, among other things. Applications may include word processors, text editors, web browsers, and other content viewing and/or modifying applications, by way of example.

The system 100 can also include a neural network component 150, which can be embodied in a remote computing device, such as a server or cluster of servers (not shown). In some embodiments, the neural network component 150 can be a component of the computing device 110, whereby the computing device 110 includes the requisite application and/or modules to perform the functions of a neural network. It is within the purview of the present disclosure to assume that the neural network component 150 is a system component configured to perform various skilled operations based on its training process and provided training data, as one of skill in the art may appreciate. In this regard, the neural network component 150 can be in coupled communication with the computing device 110 directly, or via the network 140, in accordance with various embodiments described herein.

On a high level, in various embodiments, the computing device 110 can employ an application 125 to access and view the electronic document 115 and the content included therein. The electronic document 115 can be communicated from the computing device 110 to the neural network component 115 as input data, so that the neural network component 115 can perform operations disclosed herein to tag consecutive portions of content within the electronic document 115 to indicate a corresponding determined emotion, each tagged portion capable of being variable in size. The neural network component 115, once having analyzed and processed the electronic document 115 to include the tagged portions, can provide to the computing device 110 the tagged electronic document 115' (e.g., a modified electronic document or a newly-generated electronic document) as output data.

Figure 2:
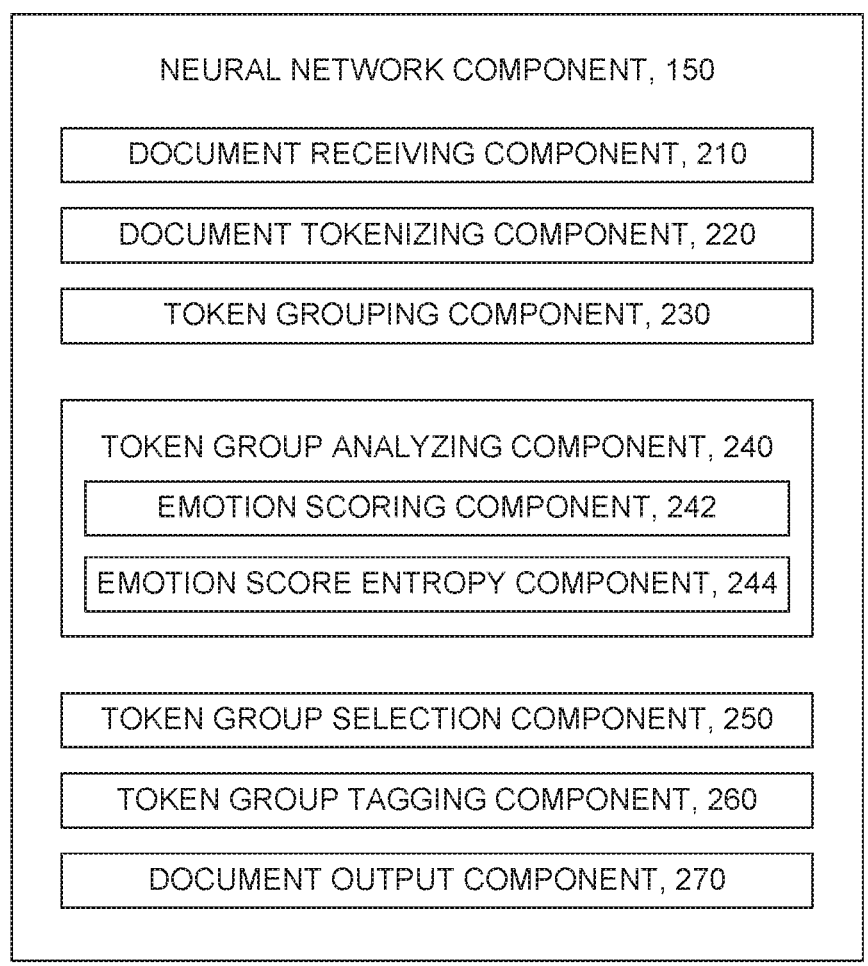
FIG. 2 is a block diagram depicting an exemplary neural network component in accordance with some embodiments of the present invention.

Looking now to FIG. 2, a neural network component 150 is depicted, illustrating various subcomponents of the neural network component 150. The neural network component 150 can include a variety of well-known components typically found in a trainable neural network. However, embodiments described herein are directed to specific components and operations of a neural network trained to determine, among other things, variable-sized blocks of content within a provided electronic document, that each correspond to one of a plurality of determinable human emotions. Described embodiments are further directed to specific components and operations of the neural network that generate tags to insert or include into the electronic document, such that when the electronic document is accessed and viewed on a computing device, such as computing device 110, each variably-sized block of content is tagged with a corresponding determined human emotion.

The neural network component 150 can include a document receiving component 210 that receives, as input data, an electronic document having content included therein, such as electronic document 115. The document receiving component 210 can be adapted to receive electronic documents of a defined set of file types, such as text files, Word files, HTML files, XML files, image files, or video files, by way of example only. In accordance with embodiments described herein, the received electronic document includes content that is interpretable as a language (e.g., English) of which the neural network component 150 was trained. While embodiments described herein are directed to text-based electronic documents, or electronic documents having text included therein, it is contemplated that the neural network component 150 can be adapted to perform the described operations on other types of electronic documents so long as text data is extractable therefrom. For instance, and by way of example only, if a media file (e.g., video, audio) included a voice dialog therein, in some embodiments, a voice-to-speech engine may be employed to extract the dialog text from the media file. In this regard, the extracted dialog text may be interchangeably referenced herein as the electronic document. In such embodiments, it is further contemplated that frame references from which the dialog text was extracted, may be associated with corresponding portions of the extracted dialog text, so that any tags ultimately inserted or incorporated into the electronic document are placed accordingly into the appropriate location of the media file.

The neural network component 150 can also include a document tokenizing component 220 that can parse the electronic document 115 to generate tokens based on predefined characteristics identified therein. A predefined characteristic may include, among other things, a period, a comma, a paragraph break, a page break, a capital letter after an identified period, and the like. In a preferred embodiment, the predefined characteristic can include a period, such that each sentence (e.g., ending with a period) of the electronic document is parsed out by the document tokenizing component as an individual token. With brief reference to FIG. 3, an exemplary electronic document 115 having text-based content 300 included therein is illustrated. As described, the document tokenizing component 220 can parse the electronic document to generate tokens based on the content, whereby each token is defined at least in part by an identified period, such as period 307. In the exemplary electronic document 115, each sentence is parsed separately into individual tokens 302, 304, 306, 308, 310, 312, 314, 316, 318, 320, generated by the document tokenizing component 220.

The neural network component 150 can also include a token grouping component 230 that can generate variably-sized groups or "sets" of generated tokens, such as tokens 302, 304, 306, 308, 310, 312, 314, 316, 318, 320. In some embodiments, the token grouping component 230 can be configured with a predefined maximum number of token sets allowed for inclusion into a generated token group. When a predefined maximum number of token sets is included in a generated token group, a token series is defined. In a preferred embodiment, the predefined maximum of token sets is defined with a value of three (3). In this regard, when a token group is generated by the token grouping component 230, no more than three tokens can be included into the token group, thereby defining the a token series.

The token grouping component 230 typically begins generating token groups at the beginning of an electronic document 115, which typically corresponds to the first generated token (e.g., the first sentence of the electronic document). When an electronic document 115 is first received and is tokenized, the first generated token is defined by the token grouping component 230 as an anchor token. The anchor token corresponds to a token that is included in each generated token group of a token series, up to the predefined maximum number before the generated token groups are sent to the token group analyzing component 230 for analysis, as will be described. Depending on which token group is ultimately selected and tagged by the neural network component 150, a new anchor token is assigned as the first generated token that is positioned immediately subsequent to the last generated token of the selected and tagged token group.

Figure 3:
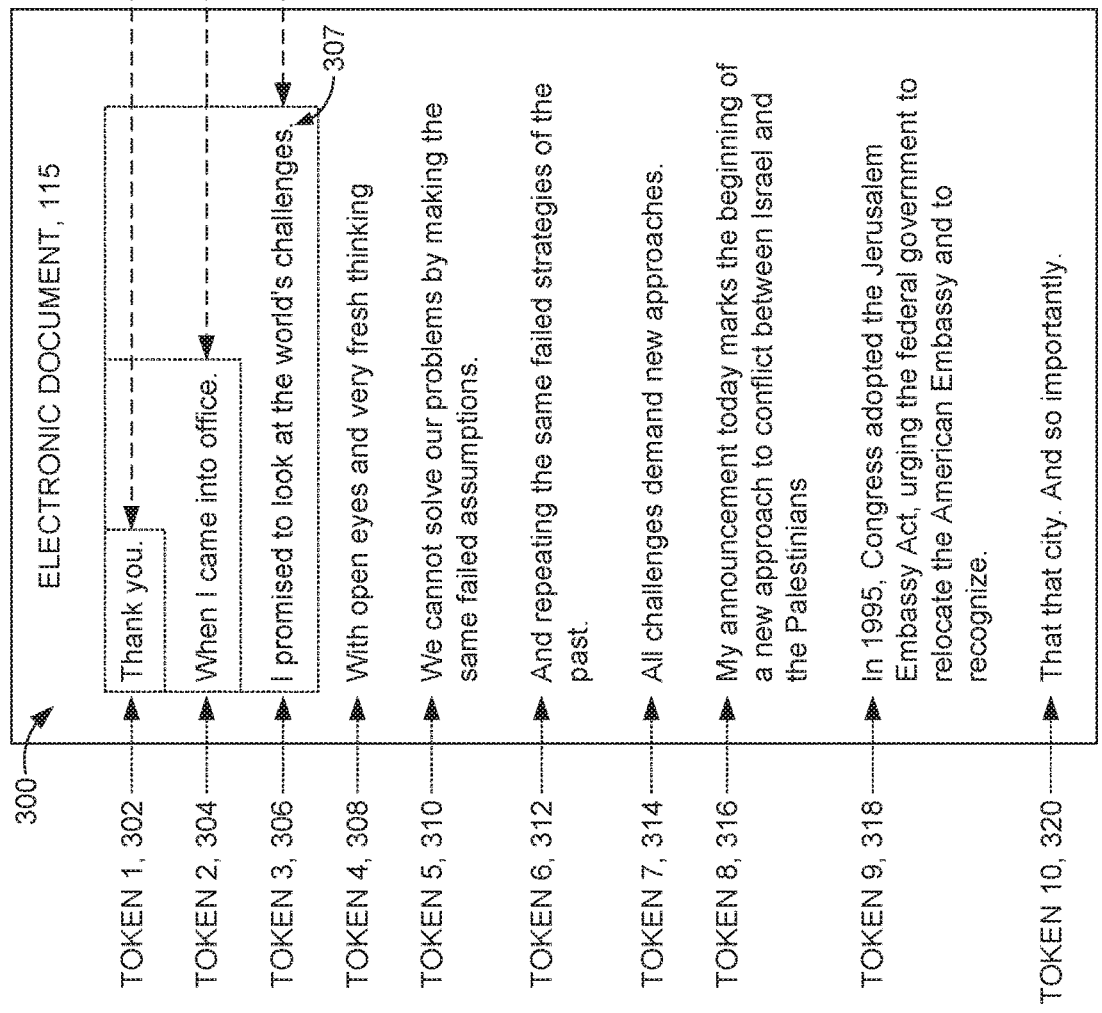
FIG. 3 is an illustration of an exemplary electronic document depicted in accordance with some embodiments of the present invention.

Beginning with the anchor token, the token grouping component 230 begins the generation of a token series 340 by generating a first token set, such as token set 330 of FIG. 3. The first token set is generated to include only the anchor token (e.g., the first generated token 302). The token grouping component 230 then generates a second token set, such as token set 332, for inclusion into the token series 340 including only the anchor token and an immediately subsequent token (e.g., the second generated token 304). The token grouping component 230 then generates a third token set, such as token set 334, for inclusion into the token series 340 including only the anchor token and the two immediately subsequent tokens (e.g., the second and third generated tokens 304, 306). The token grouping component 230 continues the token group generation process until the predefined maximum number of token sets for the token series is generated. The aforementioned process provides what is referred to herein as a "sliding window" of tokenizing portions of the electronic document 115 for analysis.

When each token group of a token series is generated, each token group is provided to the token group analyzing component 240 as input data. The token group analyzing component 240 can include a variety of sentiment or emotion determining operations generally known to one of ordinary skill in the art. In various embodiments, it is contemplated that the token group analyzing component 240 has been trained with training data that enables the neural network component 150 to determine, with a calculated level of confidence determined by the neural network component 150, an emotional score (e.g., a confidence or likelihood) that input data being analyzed corresponds to one of a plurality of determinable human emotions. In various embodiments, an emotional score can be calculated by emotion scoring component 242, which calculates a probability value for each emotion in a set of determinable human emotions based on the input data provided thereto. The emotion scoring component 242 analyzes an entire token group as a single set of input data. In this regard, as the first token group 330 is provided to the token group analyzing component 240, all of the text included in the first token 302 is analyzed. Similarly, as the second token group 330 is provided to the token group analyzing component 240, all of the text included in the first and second tokens 302, 304 is analyzed together as a single set of input data, with no regard to the individual tokens or determinable characteristics (e.g., periods) included therein.

As noted, each token group in a token series is independently provided to the token group analyzing component 230 for analysis. The token group analyzing component 230 generates a set of emotional confidence scores for each group provided thereto. In this regard, a set of emotional confidence scores includes a score for each determinable human emotion being searched for by the token group analyzing component 230. A set of emotional confidence scores generated for a token group may include scores for each determinable emotion such as sadness, happiness, anger, fear, joy, or neutral, by way of example. Thus, each token group analyzed by the token group analyzing component 230 will have associated therewith a corresponding set of emotional confidence scores.

The neural network component 150 can also include an emotion score entropy component 244 that calculates an entropy value for each analyzed token group. In other words, the set of emotional confidence scores generated for an analyzed token group is received as input data by the emotion score entropy component 244 to calculate a corresponding entropy value. The emotion score entropy component 244 determines a likelihood of certainty value for a particular probability data point, here being one of the determinable human emotions in the set of emotional confidence scores having a highest emotional confidence score determined by emotion scoring component 242. Generally, a high entropy value calculated for a determinable human emotion having the highest confidence score would indicate a smaller level of certainty that the determinable human emotion should be associated with the analyzed token group. On the other hand, a low entropy value calculated for a determinable human emotion having the highest confidence score would indicate a greater level of certainty that the determinable human emotion should be associated with the analyzed token group. In this regard, each token group in a token series is provided with a calculated entropy value that corresponds to one of the determinable human emotions in the corresponding set of emotional confidence scores.

The neural network component 150 can also include a token group selection component 250 that receives each of the calculated entropy values for the analyzed token groups in the token series. The token group selection component 250 can compare each of the calculated entropy values and compare the values to determine a lowest entropy value calculated among the analyzed token groups. The token group selection component 250 can then select one of the analyzed token groups in the token series, having the determined lowest entropy value, as a representative token group associated with the determinable human emotion having the highest confidence score.

Figure 4:
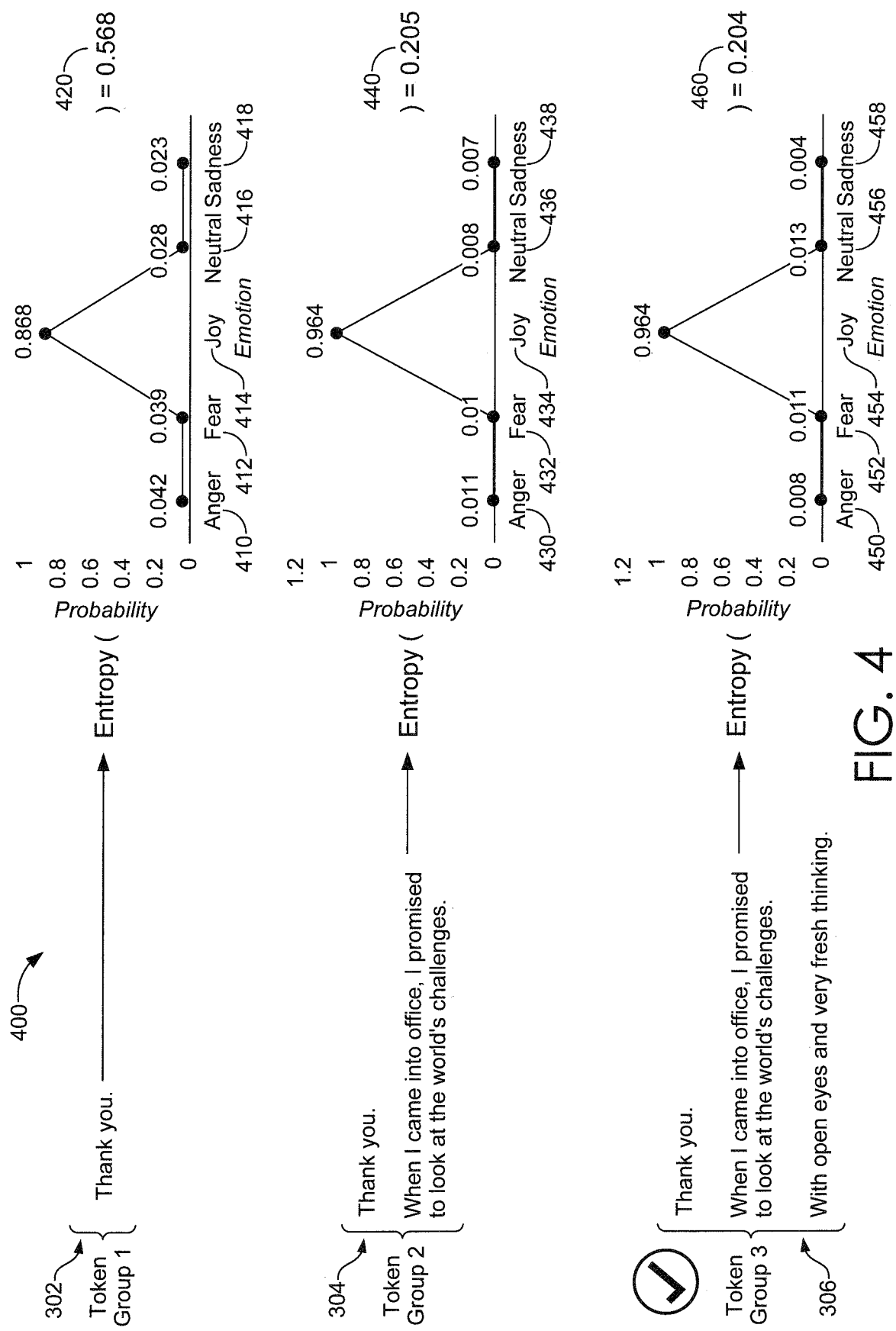
FIG. 4 is an illustration depicting exemplary operations performed by a token group analyzing component in accordance with some embodiments of the present invention.

By way of example, with reference to FIG. 4, illustrating exemplary steps 400 performed by token group analyzing component 240, emotional confidence scores 410, 412, 414, 416, 418 are determined for each emotion in a set of determinable human emotions based on content included in the first token group 302. Similarly, emotional confidence scores 430, 432, 434, 436, 438 are determined for each emotion in a set of determinable human emotions based on content included in the second token group 304, and emotional confidence scores 450, 452, 454, 456, 458, are determined for each emotion in a set of determinable human emotions based on content included in the third token group 306. Based on the generated emotional confidence scores, an emotion entropy value 420, 440, 460 is calculated for each of the token groups. As the calculated entropy value 460 for the third token group 306 is determined as having a lowest calculated entropy value, the third token group 306 is selected as a representative token group and the corresponding emotion, "Joy," having a highest determined confidence value in the corresponding set of emotional confidence scores 450, 452, 454, 456, 458, is selected for association with the third token group 306.

The neural network component 150 can also include a token group tagging component 260 that generates a tag, index entry, or other metadata for association with the content included in the selected token group (e.g., the representative token group). In various embodiments, the tag can be a comment, an annotation, a highlight with a color corresponding to an emotion, or any other visual indicator that can be embedded into the electronic document such that when the electronic document is provided for display via a compatible application, the visual indicator corresponding to the content included in the selected token group is presented with the content. In some embodiments, it is contemplated that a new document can be generated, where each portion of content that is tagged, indexed, or associated with metadata is separately inserted into the new document as an independent block of text (e.g., a paragraphs). In this regard, each block of text can be tagged or indexed in accordance with any of the techniques described herein.

In further embodiments, the neural network component 150 can define a new anchor token based on the selected token group. That is, when a representative token group is selected, a generated token that is positioned immediately subsequent to a last token of the selected group is defined as a new anchor token so that the "sliding window" analysis can begin on remaining portions of the electronic document. The neural network component 150 can repeat the sliding window analysis until an entirety of the electronic document is processed and tagged with determinable human emotions throughout.

The neural network component 150 can include a document output component 270 that provides, as output data, the tagged electronic document having a portion tagged therein with corresponding determinable human emotions. In accordance with embodiments described herein, the tagged portions may have a variable size, such that portions or blocks of content included in the electronic document can be more easily identified, separable, and even more accurate than conventional sentiment and/or emotion determining technologies. The notion of tagging as described herein can include an insertion of metadata identifying portions of the content with corresponding human emotions, highlighting portions of the content with different colors that each correspond to a human emotion, an insertion of a comment, annotation, or footnote to pieces of content that identifies corresponding human emotions, and the like.

Figure 5:
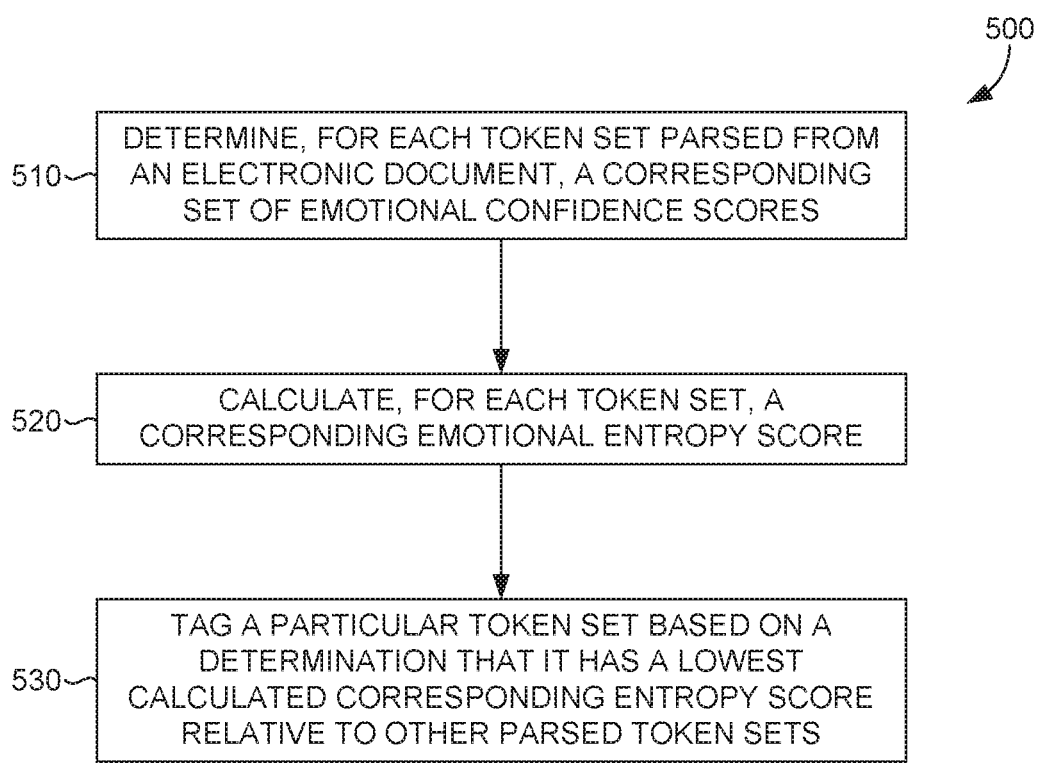
FIG. 5 is a flow diagram of an exemplary method for tagging contextually-coherent blocks of text from an electronic document depicted in accordance with some embodiments of the present invention.

Turning now to FIG. 5, a flow diagram 500 is provided that illustrates a computer-implemented method for extracting emotionally-coherent text blocks from electronic documents. As described, the content of the electronic document is parsed into tokens, such as individual sentences, by way of example. A plurality of token sets is parsed from the electronic document. In some embodiments, the plurality can include up to a predefined maximum number of token sets. Each token set in the plurality includes a defined anchor token. In other words, when an electronic document is first being analyzed or processed, a first parsed token can be defined the anchor token. A first token set in the plurality is generated starting with only the anchor token (e.g., first token) being included therein. Each subsequent token set generated in the plurality includes the token(s) included in a previously generated token set, and an immediately subsequently positioned token. In this regard, a second token set in the plurality is generated including the anchor token and a token positioned immediately after the anchor token, while a third token set is generated including the anchor token and two tokens positioned in sequence immediately after the anchor token, and so forth. As shown at block 510, the content included in each token set in the plurality of token sets is analyzed, in whole, so that a set of emotional confidence scores is determined. In other words, the textual content of a token set is analyzed and a score for each of a plurality of determinable human emotions is determined based on the textual content.

At block 520, an emotional entropy score is calculated for each token set based on the corresponding set of determined emotional confidence scores. In other words, as each token set is associated with a determined set of emotional confidence scores, an entropy score is determined from the determined set of emotional confidence scores and associated with the token set. At block 530, the calculated entropy scores for the token sets in the plurality of token sets are compared to select one of the token sets having a determined lowest calculated entropy score. The token set determined to have the lowest calculated entropy score is selected as a representative token set, and is tagged with one of the plurality of human emotions that corresponds to a highest determined emotional confidence score in the determined set of emotional confidence scores.

Figure 6:
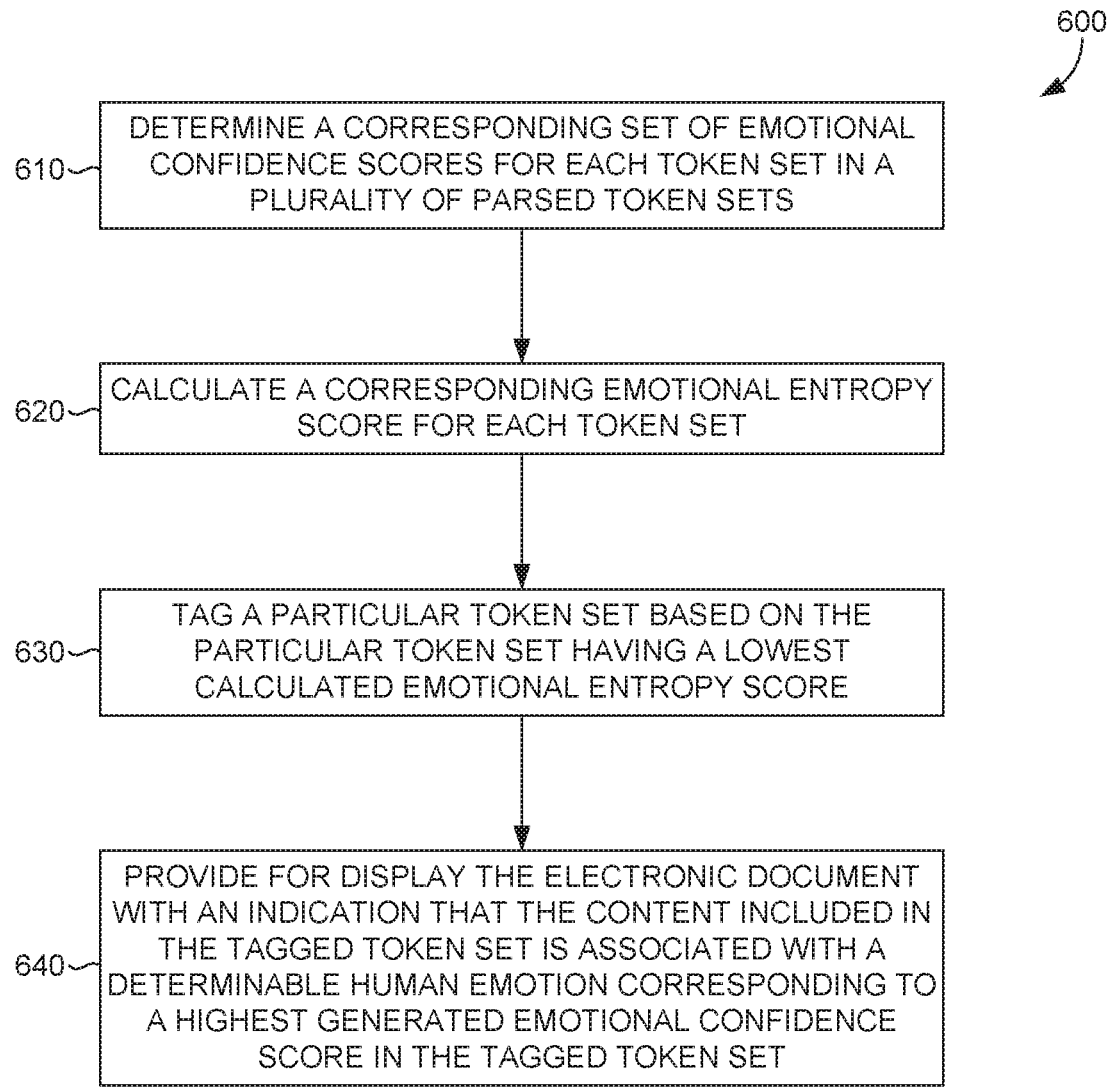
FIG. 6 is a flow diagram of an exemplary method for tagging and providing for display contextually-coherent blocks of text from an electronic document depicted in accordance with some embodiments of the present invention.

Turning now to FIG. 6 another flow diagram 600 is provided that illustrates a computer-implemented method for extracting emotionally-coherent text blocks from electronic documents. As shown at block 610, a corresponding set of emotional confidence scores is determined for each token set in a plurality of token sets parsed from an electronic document. Each emotional confidence score in the corresponding set of emotional confidence scores corresponds to a determined likelihood that content included in the token set is associated with one of a plurality of determinable human emotions. Each token set in the plurality of parsed token sets includes a defined anchor token (e.g., first token) of the electronic document. At block 620, a corresponding emotional entropy score is calculated for each token set in the plurality of parsed token sets based on the corresponding set of determined emotional confidence scores. At block 630, one of the plurality of parsed token sets is tagged as a representative token set based on a determination that it has a determine lowest calculated emotional entropy score. At block 640, the electronic document (or another generated electronic document) is provided for display with, among other things, a visual representation that indicates that the content in the tagged token set is associated with one of the determinable human emotions determined to correspond to a highest generated emotional confidence score in the tagged token set.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, a processor 714, a presentation component 716, input/output (I/O) ports 718, input/output components 720, and an illustrative power supply 722. Bus 710 represents what may be an address bus, data bus, or combination thereof. Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with some embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes processor(s) that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, dynamically identifying and extracting or tagging emotionally coherent text blocks from an electronic document based on the content included therein. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by a computing device, cause the computing device to perform operations comprising:
    generating a plurality of token sets based on a plurality of tokens parsed from an electronic document, wherein a first token set of the plurality of token sets includes at least a first token of the plurality of tokens, and a second token set of the plurality of token sets includes at least the first token set;
    determining, for each token set in the plurality of token sets, a corresponding set of emotional confidence scores based on content included in the token set, each emotional confidence score in the corresponding set of emotional confidence scores corresponding to a likelihood that content included in the token set is associated with one of a plurality of determinable human emotions;
    calculating, for each token set in the plurality of token sets, a corresponding emotional entropy score based on the corresponding set of determined emotional confidence scores;
    tagging the first token set in the plurality of token sets as an emotionally representative token set based on a determination that the first token set has a lowest calculated corresponding entropy score relative to other token sets in the plurality of token sets; and
    providing for display the electronic document with a visual representation of the tagged first token set, adjacent to a plurality of other tagged token sets, the visual representation indicating that the content included in the tagged first token set is associated with one of the plurality of determinable human emotions determined to correspond to a highest generated emotional confidence score in the tagged first token set.

2. The non-transitory computer storage medium of claim 1, wherein each token set in the plurality of token sets is sequentially parsed from the electronic document and the second token set includes one more parsed token relative to the first token set.

3. The non-transitory computer storage medium of claim 2, wherein each token set is parsed starting from the first token, and wherein the one more parsed token is a second token sequentially parsed from the electronic document relative to the first token.

4. The non-transitory computer storage medium of claim 1, wherein a token corresponds to a sentence of the electronic document and a token set corresponds to a sequentially ordered set of sentences of the electronic document.

5. The non-transitory computer storage medium of claim 4, wherein the sentence is determined based at least in part on a detected period; and wherein the electronic document comprises an automatic transcription from an audio or video source, a corpus of text derived from a social media feed, an electronic communication, webpage, presentation slides, spreadsheet, word-processing document, or electronic file including textual information.

6. The non-transitory computer storage medium of claim 1, wherein for each token set in the plurality of token sets, the corresponding set of emotional confidence scores is determined based on a neural network analysis of the content included in the parsed token set.

7. The non-transitory computer storage medium of claim 1, wherein the first token set is further tagged with one of the plurality of determinable human emotions associated with the determined highest generated emotional confidence score.

8. The non-transitory computer storage medium of claim 1, wherein a quantity of token sets in the plurality of token sets is a predefined maximum number of token sets.

9. A computer-implemented method for extracting emotionally-coherent text blocks from electronic documents, the method comprising:
    generating, by a computing device, a plurality of token sets based on a plurality of tokens parsed from an electronic document, wherein a first token set of the plurality of token sets includes at least a first token of the plurality of tokens, and a second token set of the plurality of token sets includes at least the first token set;
    determining, by the computing device, a corresponding set of emotional confidence scores for each token set in the plurality of token sets, each emotional confidence score in the corresponding set of emotional confidence scores corresponding to a likelihood that content included in the token set is associated with one of a plurality of determinable human emotions;
    calculating, by the computing device, a corresponding emotional entropy score for each token set in the plurality of token sets based on the corresponding set of determined emotional confidence scores;

tagging, by the computing device, the second token set in the plurality of token sets as a representative token set based on a determination that the second token set has a determined lowest calculated emotional entropy score corresponding thereto; and providing for display, by the computing device, the electronic document with a visual representation of the tagged second token set, adjacent to a plurality of other tagged token sets, the visual representation indicating that the content included in the tagged second token set is associated with one of the plurality of determinable human emotions determined to correspond to a highest generated emotional confidence score in the tagged second token set.

10. The computer-implemented method of claim 9, wherein for each token set in the plurality of token sets, the corresponding set of emotional confidence scores is determined based on a neural network analysis of the content included in the token set.

11. The computer-implemented method of claim 9, wherein a token is a sentence of the electronic document and a token set is a sequentially ordered set of sentences within the electronic document, each token being parsed from the electronic document based on identified periods included in the electronic document.

12. A computerized system comprising:
a token parsing component for identifying a plurality of tokens from an electronic document;
a token set parsing component for generating a plurality of token sets that each includes at least a first token of the plurality of tokens, wherein a first token set of the plurality of token sets includes the first token, and a second token set of the plurality of token sets includes the first token and a second token of the plurality of tokens;
an emotional confidence scoring component for determining a set of emotional confidence scores for each token set in the generated plurality of token sets based on content included in the token set, each emotional confidence score in a determined set of emotional confidence scores corresponding to one of a plurality of determinable human emotions;
an emotional entropy scoring component for calculating an emotional entropy score for each token set in the generated plurality of token sets based on the determined set of emotional confidence scores of the token set;
an emotional block identifying component for selecting the first token set based on determining that the first token set has a highest calculated emotional entropy score, wherein one of the plurality of determinable human emotions determined to have a highest emotional confidence score of the determined set of emotional confidence scores for the selected first token set is identified as a tag for the selected first token set;
an emotional block tagging component for tagging the selected first token set as an emotionally representative token set; and
a document displaying component for providing for display the electronic document with a visual representation of the tagged first token set, adjacent to a plurality of other tagged token sets, the visual representation indicating that the content included in the tagged first token set is associated with one of the plurality of determinable human emotions determined to correspond to a highest generated emotional confidence score in the tagged first token set.

13. The computerized system of claim 12, wherein the token set parsing component generates each token set in the plurality of token sets beginning with the first token, each generated token set in the plurality of token sets having one more identified token than a previously generated token set.

* * * * *